United States Patent
Liu et al.

(10) Patent No.: US 8,945,804 B2
(45) Date of Patent: Feb. 3, 2015

(54) TREATED METAL OXIDE PARTICLES AND TONER COMPOSITIONS

(75) Inventors: Jinsong Liu, Franklin, MA (US); Hairuo Tu, Boxborough, MA (US); Dmitry Fomitchev, Lexington, MA (US)

(73) Assignee: Cabot Corporation, Boston, MA (US)

( * ) Notice: Subject to any disclaimer, the term of this patent is extended or adjusted under 35 U.S.C. 154(b) by 1882 days.

(21) Appl. No.: 12/217,828

(22) Filed: Jul. 9, 2008

(65) Prior Publication Data
US 2010/0009280 A1 Jan. 14, 2010

(51) Int. Cl.
| G03G 9/097 | (2006.01) |
| C09C 1/40 | (2006.01) |
| B82Y 30/00 | (2011.01) |
| C09C 1/30 | (2006.01) |
| C09C 1/36 | (2006.01) |

(52) U.S. Cl.
CPC .......... *C09C 1/407* (2013.01); *B82Y 30/00* (2013.01); *C09C 1/3081* (2013.01); *C09C 1/3684* (2013.01); *G03G 9/09716* (2013.01); *G03G 9/09725* (2013.01); *G03G 9/09733* (2013.01); *G03G 9/09741* (2013.01); *C01P 2004/64* (2013.01); *C01P 2006/12* (2013.01)
USPC .......... 430/108.11; 430/108.2; 430/108.21; 430/108.24; 430/108.6; 430/108.7

(58) Field of Classification Search
CPC ............... G03G 9/09716; G03G 9/09766
USPC .............. 430/108.24, 108.6, 137.1, 108.2, 430/108.21, 108.7, 108.11
See application file for complete search history.

(56) References Cited

U.S. PATENT DOCUMENTS

| 4,576,888 | A | * | 3/1986 | Miyakawa et al. ...... 430/108.23 |
| 4,965,158 | A | * | 10/1990 | Gruber et al. ............ 430/108.2 |
| 4,973,540 | A | * | 11/1990 | Machida et al. ......... 430/108.11 |
| 5,102,763 | A | * | 4/1992 | Winnik et al. ........... 430/108.24 |
| 5,707,770 | A | | 1/1998 | Tanikawa et al. |
| 5,824,442 | A | | 10/1998 | Tanikawa et al. |
| 6,303,256 | B1 | | 10/2001 | Kerner et al. |
| 6,331,500 | B1 | | 12/2001 | Tsuji et al. |
| 7,303,819 | B2 | * | 12/2007 | Brotzman, Jr. ................. 428/407 |
| 2003/0198801 | A1 | | 10/2003 | Wickramanayake et al. |
| 2005/0222325 | A1 | * | 10/2005 | Brotzman ..................... 524/730 |
| 2006/0068313 | A1 | * | 3/2006 | Nakayama et al. ........ 430/109.4 |
| 2007/0196773 | A1 | * | 8/2007 | Weigel et al. ................... 430/311 |
| 2008/0070143 | A1 | | 3/2008 | Fomitchev et al. |
| 2008/0070146 | A1 | * | 3/2008 | Fomitchev et al. ......... 430/111.1 |
| 2008/0090004 | A1 | * | 4/2008 | Zhang et al. .................. 427/180 |
| 2008/0216709 | A1 | * | 9/2008 | Steingrover et al. ..... 106/287.11 |

FOREIGN PATENT DOCUMENTS

| FR | 2912400 A1 | * | 8/2008 | |
| JP | 04-204663 | | 7/1992 | |
| JP | 05088372 A | * | 4/1993 | |
| JP | 06-273972 | | 9/1994 | |
| JP | 10-133416 | | 5/1998 | |
| JP | 2002-278164 | | 9/2002 | |
| JP | 2004070003 A | * | 3/2004 | ............. G03G 9/113 |
| WO | WO 2007-065982 | | 6/2007 | |

OTHER PUBLICATIONS

Wang, Wei et al. "Fabrication of Near-Infrared Photonic Crystals Using Highly-Monodispersed Submicrometer SiO2 Spheres" J. Phys. Chem. B, 107, pp. 12113-12117 (2003).*
English language machine translation of JP 06-273972 (Sep. 1994).*
English language machine translation of JP 05-088372 (Apr. 1993).*
English language machine translation of JP 2004-70003 (Mar. 2004).*
Fowler, Christabel et al. "Nanoscale Materials with Mesostructured Interiors" Advanced Materials 13, No. 9, pp. 649-652 (2001).*
Badley et al., "Silica Bound Sulfonic Acid Catalysts", J. Org. Chem., 1989, 54, pp. 5437-5443.
Julliard et al., "Supported redox photosensitizers for the activation of alkylaromatics towards oxygen," J. Photochem. Photobiol. A: Chem., 61, 1991, pp. 137-152.
Liu et al., "The Fumed Silica Surface: A Study by NMR," J. Am. Chem. Soc. 1996, 118, pp. 5103-5119.
Lebeau et al., "Structural and dynamical studies of hybrid siloxane-silica materials," J. Mater. Chem., 1997, 7(6), pp. 989-995.
Fowler et al., "Facile synthesis of hollow silica microspheres.," J. Mater. Chem., 2001, 11, pp. 1968-1971.
Turowski et al., "Deuterium Isotope Effects on Hydrophobic Interactions: The Importance of Dispersion Interactions in the Hydrophobic Phase," J. Am. Chem. Soc. 2003, 125, pp. 13836-13849.
Machine translation of JP2004-210566, by Nippon Aerosil Co Ltd., published Jul. 29, 2004.
Machine Translation of JP06-027719, by Konica Corp., published Feb. 4, 1994.
Abstract only of JP60-093455, by FujiXerox Co Ltd., published May 25, 1985.

* cited by examiner

*Primary Examiner* — Christopher Rodee (57) ABSTRACT

Treated metal oxide particles include metal oxide particles treated with at least a charge modifying agent. The charge modifying agent is represented by the following formula:

$$An-Z_c-Y_b-Ar(EW)_a$$

wherein Ar represents an aromatic group, EW represents an electron withdrawing group, Y represents a spacer group, Z represents an alkylene group, An represents an anchor group, a is an integer from 1 to 5, b is 0 or 1, and c is 0 or 1. The treated metal oxide particles may also be treated with a second charge modifying agent or with a hydrophobicity-imparting agent. A toner composition including toner particles and treated metal oxide particles is also disclosed.

14 Claims, 2 Drawing Sheets

TREATED METAL OXIDE PARTICLES AND TONER COMPOSITIONS

BACKGROUND OF THE INVENTION

1. Field of the Invention

The present invention relates to treated metal oxide particles as well as to toner compositions including such treated metal oxide particles.

2. Description of the Related Art

Electrophotographic image formation includes developing an electrostatic latent image formed on a photoreceptor with a toner composition including a colorant dispersed in a binder resin, transferring the toner image to receiving paper, and fixing the transferred toner image by means of, for example, a hot roll. The photoreceptor is cleaned after the transferring step to prepare for the next latent image formation.

Treated metal oxide particles are commonly used in toner compositions as well as numerous other applications. In such toner applications, hydrophobicity imparting treating agents, including hydrocarbon chain silanes and/or siloxanes, are often utilized to render the metal oxide particles hydrophobic. The treated metal oxide particles are combined with toner particles in a toner composition in order to improve selected properties of the toner particles, including fluidity, transferability, fixability, and cleaning properties. In addition, the metal oxide particles are known to strongly influence the chargeability, i.e., tribocharge, of the toner composition.

The tribocharge of a toner composition containing metal oxide particles (particularly silica) depends on the temperature and relative humidity of the ambient environment. Often the tribocharge of toner formulated with silica particles is high at low humidity conditions and low at high humidity conditions. Such a dependence of the tribochargeability on environmental conditions leads to impaired transferability of the image and ultimately to reduced image quality. In contrast, the tribocharging of toner formulated with aluminum oxide particles is often too low under both high and low humidity conditions. While the chemical treatment utilized to render the metal oxide particles hydrophobic affects the tribocharge of the toner and tends to somewhat improve humidity sensitivity, there is a need for further improvement, particularly for toners formulated with silica.

Thus, a need exists for treated metal oxide particles that provide for toner compositions having improved humidity resistance in particular and reduced dependence on environmental conditions in general. There also exists a need for treated metal oxide particles facilitate fine-tuning the tribocharge of a toner composition within a wide range of tribocharge absolute values.

SUMMARY OF THE INVENTION

In one embodiment, the present invention includes a toner composition including toner particles and metal oxide particles treated with a charge modifying agent. The charge modifying agent is represented by the following formula:

wherein Ar represents an aromatic group, EW represents an electron withdrawing group, Y represents a spacer group, Z represents an alkylene group, An represents an anchor group, a is an integer from 1 to 5, b is 0 or 1, and c is 0 or 1. Such toner compositions may advantageously exhibit improved tribocharging, particularly at high humidity conditions. In exemplary toner compositions, the metal oxide particles may also be treated with a hydrophobicity-imparting agent to render the metal oxide particles hydrophobic.

In a second embodiment, the invention includes a charge modified metal oxide particle composition including metal oxide particles treated with at least one charge modifying agent represented by the above formula. In one exemplary embodiment, the metal oxide particles include alumina or titania particles having a mean particle size of less than about 500 nm. Alternatively or in addition, the metal oxide particles may include silica particles. In a further embodiment, the metal oxide particles are treated with first and second distinct charge modifying agents, each of which is independently represented by the above formula. In a preferred embodiment, the metal oxide particles are treated with both a hydrophobicity-imparting agent and a charge modifying agent represented by the above formula.

The invention further includes a method of preparing a hydrophobic, charge modified metal oxide particle composition. The method includes providing metal oxide particles, simultaneously or sequentially contacting the metal oxide particles with a hydrophobicity-imparting agent and with a charge modifying agent, and recovering the hydrophobic, charge modified metal oxide particles, wherein the charge modifying agent is represented by the above formula.

The foregoing has outlined rather broadly the features various embodiments of the present invention in order that the detailed description that follows may be better understood. Additional features and advantages of the invention will be described hereinafter which form the subject of the claims of the invention. It will be understood that both the foregoing general description and the following detailed description are exemplary and explanatory only and are intended to provide further explanation of the present invention, as claimed.

BRIEF DESCRIPTION OF THE DRAWING

The invention is described with reference to the several figures of the drawing, in which.

DETAILED DESCRIPTION OF THE INVENTION

In one embodiment, the present invention relates to a particle composition including metal oxide particles treated with at least a charge modifying agent. The charge modifying agent is represented by the following formula:

wherein Ar represents an aromatic group, EW represents an electron withdrawing group, Y represents a spacer group, Z represents an alkylene group, An represents an anchor group, a is an integer from 1 to 5, b is 0 or 1, and c is 0 or 1. The invention also relates to toners including the inventive treated particle composition. Such toners may advantageously have improved tribocharging characteristics, e.g., improved tribocharge at high humidity conditions or improved absolute value of the tribocharge at both high and low humidity conditions.

Metal oxide particles appropriate for use with the present invention include silica, alumina, ceria, germania, titania, zirconia, zinc oxide, iron oxide, or mixed oxides of any two or more of these. Preferably, the metal oxide particles include silica, alumina, titania, mixtures of any of these, or mixed oxides of any two or more of these. In one exemplary embodiment the metal oxide particles include alumina, titania, mixtures of these, or mixed oxides thereof. In another exemplary embodiment the metal oxide particles include silica. Mixtures of two or more of any of the above metal oxide particles may also be employed.

Preferably, the metal oxide particles to be treated are fumed, co-fumed, precipitated, or colloidal metal oxide particles. The metal oxide particles may be produced utilizing techniques known to those skilled in the art. See, e.g., Kodas and Hampden-Smith, *Aerosol Processing of Materials*, Wiley-VCH, 1998. The production of a fumed metal oxide is a well-documented process which involves the hydrolysis of suitable feed stock vapor (such as aluminum chloride for a fumed alumina, or silicon tetrachloride for fumed silica) in a flame of hydrogen and oxygen. Molten particles of roughly spherical shape are formed in the combustion process, and the particle diameters may be varied through control of process parameters. These molten spheres, referred to as primary particles, fuse with one another by undergoing collisions at their contact points to form branched, three dimensional chain-like aggregates. The formation of the aggregates is considered to be irreversible as a result of the fusion between the primary particles. During cooling and collecting, the aggregates undergo further collisions that may result in some mechanical entanglements to form agglomerates. These agglomerates are thought to be loosely held together by van der Waals forces and can be reversed, i.e. de-agglomerated, by proper dispersion in a suitable media. Mixed or co-fumed metal oxide particles may also be produced utilizing conventional techniques known to those skilled in the art including, for example, those described in GB 2296915A to Ettlinger et al., the specification of which is incorporated herein in its entirety by reference.

Non-limiting examples of fumed metal oxide particles include CAB-O-SIL® fumed silica and SpectrAL™ fumed alumina products available from Cabot Corporation, HDK® fumed silica products available from Wacker Chemie AG, and AEROSIL® fumed silica and AEROXIDE® fumed alumina and titania products available from Degussa Corporation. Fumed metal oxides are also commercially available in dispersed form, for example, including CAB-O-SPERSE® products available from Cabot Corporation and AERO-DISP® products available from Degussa Corporation.

Precipitated metal oxide particles may be manufactured utilizing conventional techniques and are often formed by the coagulation of the desired particles from an aqueous medium under the influence of high salt concentrations, acids, or other coagulants. The metal oxide particles are filtered, washed, dried, and separated from residues of other reaction products by conventional techniques known to those skilled in the art. Precipitated particles are often aggregated in the sense that numerous primary particles coagulate to one another to form a somewhat spherical aggregated cluster. Those of ordinary skill in the art will readily recognize that such aggregated clusters are structurally different from fumed or pyrogenically prepared particles, which are chain-like structures of aggregated primary particles in which the primary particles are fused to one another. Non-limiting examples of commercially available precipitated metal oxides include Hi-Sil® products from PPG Industries, Inc. and SIPERNAT® products available from Degussa Corporation.

Colloidal metal oxide particles are often non-aggregated, individually discrete (primary) particles, which typically are spherical or nearly spherical in shape, but can have other shapes (e.g., shapes with generally elliptical, square, or rectangular cross-sections). Colloidal metal oxide particles are typically fabricated in a manner similar to precipitated metal oxide particles (i.e., they are coagulated from an aqueous medium) but remain dispersed in a liquid medium (often water alone or with a co-solvent and/or stabilizing agent). See, e.g., Akitoshi Yoshida, *Silica Nucleation, Polymerization, and Growth Preparation of Monodispersed Sols*, in Colloidal Silica Fundamentals and Applications 47-56 (H. E. Bergna & W. O. Roberts, eds., 2006). Non-limiting examples of commercially available colloidal silica suitable for use in the invention include SNOWTEX™ products from Nissan Chemical, NexSil™ and NexSil A™ series products available from Nyacol Nanotechnologies, Inc., PL™ series products available from Fuso, and Levasil™ products available from H. C. Starck.

The metal oxide particles are treated with at least a charge modifying agent. The charge modifying agent may be represented by the following formula:

$$\text{An-}Z_c\text{—}Y_b\text{—}Ar(EW)_a$$

where Ar represents an aromatic group, EW represents an electron withdrawing group, Y represents a spacer group, Z represents an alkylene group, An represents an anchor group, a is an integer from 1 to 5, b is 0 or 1, and c is 0 or 1. It will be appreciated that when b and c equal zero, the anchor group An is bonded directly to the aromatic group.

The aromatic group is substituted with an electron withdrawing group. It will be appreciated by those of skill in the art that electron withdrawing groups have a positive Hammett Constant. The Hammett Constant is defined on the basis of the ionization constant of a substituted benzoic acid at 25° C. such that $\sigma = \log(K/K_0)$, where $\sigma$ represents the Hammett Constant, K represents the ionization constant of a meta or para substituted benzoic acid, and $K_0$ represents the ionization constant of benzoic acid. Electron withdrawing groups increase the acidity of benzoic acid (i.e., $K > K_0$) and therefore have a positive Hammett Constant. Preferred electron withdrawing groups for use with the invention have a Hammett Constant of at least 0.2 (e.g., at least 0.3 or at least 0.5) in either of the meta or the para positions. Furthermore, the electron withdrawing group is preferably not charged. Preferred electron withdrawing groups include nitro (—$NO_2$), cyano (—CN), acetyl (—$COCH_3$), sulfonic acid (—$SO_3H$), methylsulfonyl (—$SO_2CH_3$), fluoro (—F), and perfluoroalkyl (—$(CF_2)_nCF_3$, wherein n is 0 or an integer from 1 to 10). When the electron withdrawing group is fluoride, a is preferably at least 2. Nitro (—$NO_2$) is a most preferred electron withdrawing group.

The spacer group Y is used as a link between two groups (when b equals 1). For example, when c equals 1, Y links the alkylene group Z to the aromatic group Ar. When c equals 0, Y links the anchor group An to the aromatic group Ar. When b equals 0, the spacer group may simply be thought of as being a chemical bond. Examples of suitable spacer groups include, but are not limited to, —$CO_2$—, —$O_2C$—, —CO—, —$OSO_2$—, —$SO_3$—, —$SO_2$—, —$SO_2C_2H_4O$—, —$SO_2C_2H_4S$—, —$SO_2C_2H_4NR$, —O—, —S—, —NR—, —NRCO—, —CONR—, —$NRCO_2$—, —$O_2CNR$—, —NRCONR—, —N(COR)CO—, —CON(COR)—, —NRCOCH($CH_2CO_2R$)—, —NRCOCH$_2$CH($CO_2R$)—, —CH($CH_2CO_2R$)CONR—, —CH($CO_2R$)$CH_2CONR$—, sulfonamide groups (including —$SO_2NR$— and —$NRSO_2$— groups), arylene groups, alkylene groups and the like. R, which can be the same or different, represents hydrogen or an organic group such as a substituted or unsubstituted aryl or alkyl group. Preferred spacer groups include amino groups (—N(R)—), amido groups (—N(R)C(O)— or —C(O)N (R)—), ester groups (—OC(O)— or —C(O)O—), oxo (—O—), sulfo (—S—), imino groups (—CH═N— or —N═CH—), azo groups (—N═N), or sulfonyl groups (—S(O)$_2$—), where R represents hydrogen or an organic group such as a substituted or unsubstituted aryl or alkyl group.

The alkylene group Z may include substantially any linear or branched, saturated or unsaturated, $C_1$-$C_{18}$ alkylene group. When Z is an unsaturated alkylene group, Z may have more than one double or triple bond, but is preferably not conjugated. Preferably, the alkylene group is $(CH_2)_e$, where e is an integer from 1 to 18. The aromatic group Ar may be a five or six membered ring, optionally containing a heteroatom such as N or S.

The particular anchor group An that is selected depends at least partially on the metal oxide particles to be treated. For example, organosilane groups may be advantageously utilized for substantially any metal oxide particle. Organosilane groups are also known in the chemical arts to be useful for glass and fused silica substrates. Carboxylic acid groups may also be used as suitable anchors for substantially any metal oxide particle, particularly silica and alumina. In addition, phosphonic acid groups (—$PO_3H_2$) may be utilized, for example, for particles including alumina. Other functional groups that may be suitable for use as anchors include phosphoryl and phosphonic groups, hydroxyl groups, and amino acid groups.

In preferred embodiments of the invention, the anchor group An is represented by $X_dSiR_{(3-d)}$, where X represents equal or different hydroloyzable groups or a siloxane group, R represents hydrogen or an organic group such as a substituted or unsubstituted aryl or alkyl group, and d is an integer from 1 to 3. Exemplary anchor groups include oxysilane groups such as —$Si(O(CH_2)_nCH_3)_3$ wherein n is 0 or an integer from 1 to 10. Trimethoxysilane and triethoxysilane represent non-limiting examples of such oxysilane groups. In exemplary embodiments, X is selected from $OR^2$, where $R^2$ is $C_1$-$C_{10}$ branched or straight chain alkyl or a halogen, preferably chlorine.

Figure 1:
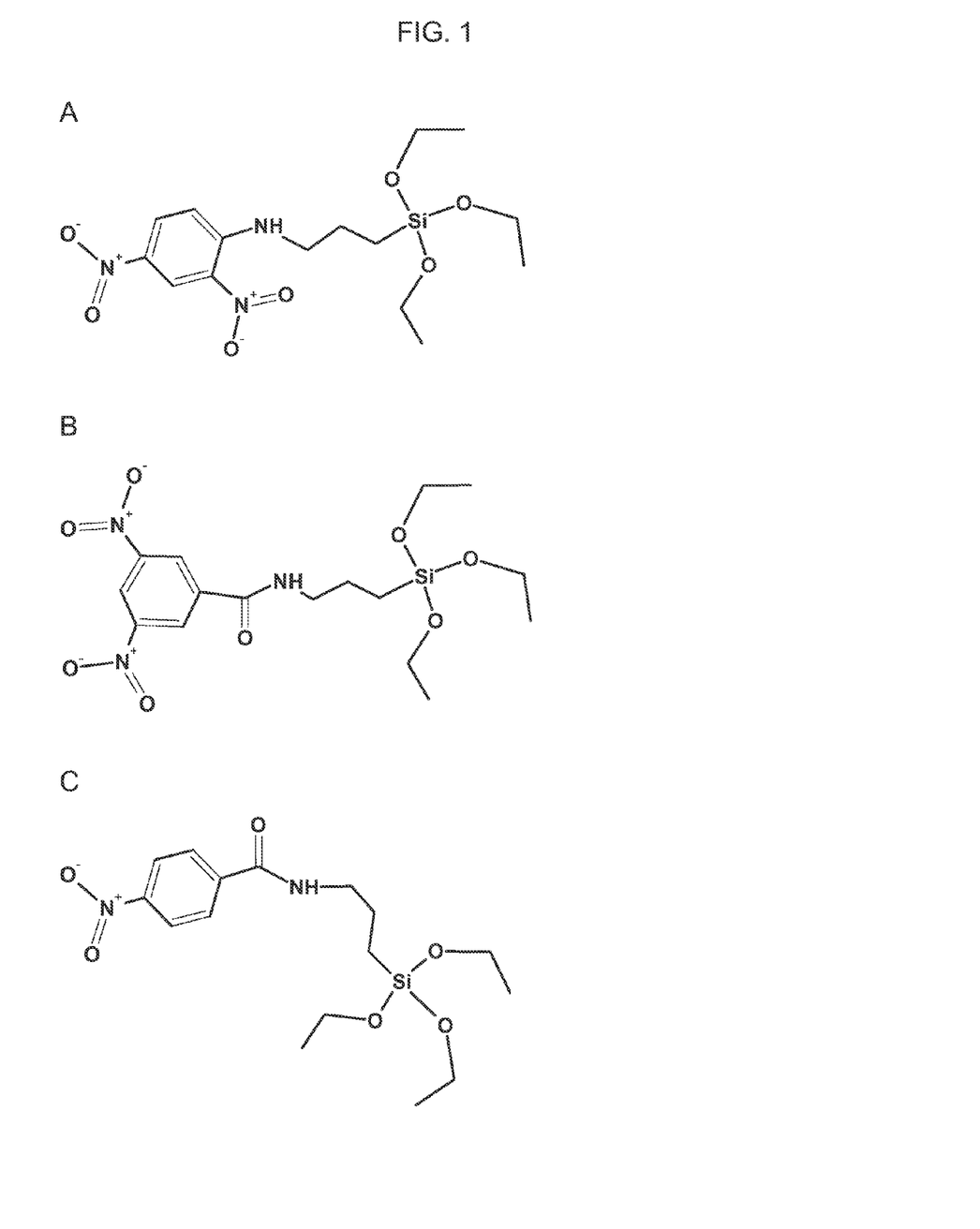
FIG. 1 shows the chemical structures of several charge modifying agents for use according to exemplary embodiments of the invention (A: 3-(2,4-dinitrophenylamino) propyltriethoxsilane (DNPS), B: 3,5-dinitrobenzamido-n-propyltriethoxysilane, C: 3-(triethoxysilylpropyl)-p-nitrobenzamide (TESPNBA), D: pentafluorophenyl-triethoxysilane (PFPTES), or E: [2-(4-chlorosulfonylphenyl)ethyltrimethoxysilane (CSPES)

Exemplary charge modifying agents include, but are by no means limited to, 3-(2,4-dinitrophenylamino)propyltriethoxysilane (DNPS), 3,5-dinitrobenzamido-n-propyltriethoxysilane, 3-(triethoxysilylpropyl)-p-nitrobenzamide (TESP-NBA), pentafluorophenyltriethoxysilane (PFPTES), and [2-(4-chlorosulfonylphenyl)ethyltrimethoxysilane (CSPES) (FIG. 1).

Charge modified metal oxide particle compositions in accordance with the present invention may also be treated with a second charge modifying agent. In such dual treated metal oxide particle compositions, the second charge modifying agent is independently represented by the formula:

An-$Z_c$—$Y_b$—Ar(EW)$_a$ where, as described above, Ar represents an aromatic group, EW represents an electron withdrawing group, Y represents a spacer group, Z represents an alkylene group, An represents an anchor group, a is an integer from 1 to 5, b is 0 or 1, and c is 0 or 1. Suitable and preferred electron withdrawing groups, spacer groups, alkylene groups, and anchor groups are as previously described hereinabove.

In certain non-limiting embodiments, at least one of the first and second distinct charge modifying agents may be selected such that it renders the metal oxide particles hydrophobic. In such embodiments, at least one of the charge modifying agents may advantageously be selected such that the electron withdrawing group EW is —F or —$(CF_2)_nCF_3$, wherein n is 0 or an integer from 1 to 10.

Exemplary treated metal oxide particles in accordance with the present invention may also be treated with a hydrophobicity-imparting agent to render the particles hydrophobic. Without wishing to be bound by any particular theory, it is believed that the hydrophobicity-imparting agent reacts with surface hydroxyl groups on the surface of the metal oxide particles to effectively replace the hydrophilic groups with other, hydrophobic, chemical groups. The type of treating agent and the level of treatment will vary depending upon the desired degree of hydrophobicity and other characteristics.

"Hydrophobic" metal oxide particles, as the term is used herein, encompass varying levels or degrees of hydrophobicity. The degree of hydrophobicity imparted to the metal oxide particles will vary depending upon the type and amount of treating agent used. Hydrophobic metal oxide particles according to the invention may, for example, have from about 15% to about 85% of the available metal oxide surface hydroxyl groups reacted, for example, from about 25% to about 75% or from about 40% to about 65% of the available metal oxide surface hydroxyl groups reacted or a percentage in any range bounded by any two of the above endpoints.

Substantially any suitable hydrophobicity-imparting agent may be utilized to render the metal oxide particles hydrophobic. Preferred hydrophobicity-imparting agents are silazane compounds, siloxane compounds, and silane compounds. Examples of silane compounds include alkylhalosilanes, alkylsilanes, and alkoxysilanes. Alkoxysilanes include compounds having the general formula: $R^1_xSi(OR^2)_{4-x}$ wherein $R^1$ is selected from the group consisting of $C_1$-$C_{30}$ branched and straight chain alkyl, alkenyl, $C_3$-$C_{10}$ cycloalkyl, and $C_6$-$C_{10}$ aryl, $R^2$ is $C_1$-$C_{10}$ branched or straight chain alkyl, and x is an integer of 1-3. Alkylhalosilanes include compounds having the general formula $R^1_xSiR^2_yX_{4-x-y}$, where $R^1$ and $R^2$ are as defined above, X is a halogen, preferably chlorine, and y is 1, 2, or 3.

Non-limiting examples of useful silane coupling agents include trimethylsilane, trimethylchlorosilane, dimethyldichlorosilane, methyltrichlorosilane, allyldimethylchlorosilane, benzyldimethylchlorosilane, methyltrimethoxysilane, methyltriethoxysilane, isobutyltrimethoxysilane, dimethyldimethoxysilane, dimethyldiethoxysilane, trimethylmethoxysilane, hydroxypropyltrimethoxysilane, phenyltrimethoxysilane, n-butyltrimethoxysilane, n-hexadecyltrimethoxysilane, n-octadecyltrimethoxysilane, vinyltrimethoxysilane, vinyltriethoxysilane, γ-oxypropyltrimethoxysilane methacrylate, vinyltriacetoxysilane, and the like. Non-limiting examples of useful silazane compounds include hexamethyldisilazane (HMDZ), hexamethylcyclotrisilazane, octamethylcyclotetrasilazane, and the like. Non-limiting examples of useful siloxane compounds include dimethylpolysiloxane, methylhydrogen polysiloxane, methylphenylpolysiloxane, octamethylcyclotetrasiloxane, hexamethylcyclotrisiloxane, and the like. Preferred hydrophobicity-imparting agents are hexamethyldisilazane, isobutytrimethoxysilane, and octyltrimethoxysilane.

The metal oxide particles to be treated can have any suitable average non-agglomerated particle size. The particle size refers to the diameter of the smallest sphere that encloses the non-agglomerated particle. Agglomerated particles (agglomerates) are composed of several primary particles loosely attached to each other, usually by van der Waals forces. This is in contrast to aggregated particles (aggregates), in which the bonds between primary particles are stronger, as is the case when the particles sinter. As a result, de-agglomeration can be easily achieved for agglomerates. For example, dispersion of treated metal oxide particles with toner particles (dry dispersion) or in a suitable aqueous or non aqueous liquid (e.g., tetrahydrofuran (THF)) using high speed agitation or sonication can be used to reverse agglomeration. However, it is considerably more difficult or even impossible to reverse aggregation to any significant extent.

Exemplary precipitated or colloidal metal oxide particles for use with the invention may have an average primary particle size in a range from about 5 nm to about 500 nm, from about 10 nm to about 300 nm, from about 20 nm to about 200 nm, from about 40 nm to about 100 nm, or in any range bounded by any two of the above endpoints. Particle size may be measured using dynamic light scattering (DLS), using instrumentation known to those of skill in the art, for example, particle size analyzers available from Microtrac, Inc., Montgomeryville, Pa. (such as the Microtrac Particle Size Analyzer UPA 150) and Malvern Instruments Ltd., Malvern Worcestershire, UK.

Precipitated and colloidal metal oxide particles for use with the invention may have a BET surface area (determined by the method of S. Brunauer, P. H. Emmet, and I. Teller, J. Am. Chemical Society, 60, 309 (1938), which is commonly referred to as the BET method) in a range from about 5 $m^2/g$ to about 200 $m^2/g$, from about 15 $m^2/g$ to about 175 $m^2/g$, from about 30 $m^2/g$ to about 150 $m^2/g$, from about 40 $m^2/g$ to 100 $m^2/g$, or in any range bounded by any two of the above endpoints.

Fumed or co-fumed metal oxide particles for use with the invention may have an aggregate particle size in one of the ranges given above for precipitated or colloidal metal oxide particles. Fumed or co-fumed metal oxide particles may also have an average primary particle size in a range from about 5 nm to about 50 nm, from about 10 nm to about 40 nm, 15 nm to about 30 nm, or in any range bounded by any two of the above endpoints. The aggregate size of fumed and co-fumed metal oxide particles may also be measured using dynamic light scattering. Fumed or co-fumed metal oxide particles may also have a BET surface area in a range from about 35 $m^2/g$ to about 500 $m^2/g$, from about 55 $m^2/g$ to about 350 $m^2/g$, from about 70 $m^2/g$ to about 200 $m^2/g$, any range bounded by any two of the above endpoints.

The carbon content of the treated particles can be determined using commercially available carbon analyzers (e.g., Leco C-200). The carbon content of the treated metal oxide particles may be used as an indicator of the level of treatment of the treated metal oxide particles and, thus, as an indicator of the degree of charge modification. For example, for metal oxide particles treated with the same treating agent, such as the charge modifying agents described above (or treating agents having a similar number of carbon atoms), the carbon content may be a reliable indicator of the treatment levels. Those of ordinary skill will readily recognize that the measured carbon content will however depend on the treating agent (or agents) utilized. Thus, the measured carbon content of metal oxide particles being treated with a treating agent having a large number of carbon atoms will often be greater than that of a metal oxide particle being treated with a treating agent having comparatively fewer carbon atoms. Treated metal oxide particles prepared in accordance with the invention may have a carbon content in a range from about 0.1 wt. % to about 8 wt. % or in a range from about 1 wt. % to about 4 wt. % or in any range defined by any two of the above endpoints.

The amount of charge modifying agent that is added to the metal oxide particles may be any suitable amount. Those of ordinary skill in the art will readily be able to optimize the amount of charge modifying agent that is added to the metal oxide particles depending, for example, on the particle composition, the particle size and surface area, the choice of the charge modifying agent and (when present) the hydrophobicity-imparting agent, and the composition of the end product with which the particle composition is being combined (e.g., a toner composition).

In one exemplary embodiment, the amount of the charge modifying agent may be in a range from about 0.1 $\mu mole/m^2$ to about 100 $\mu mole/m^2$, from about 0.2 $\mu mole/m^2$ to about 50 $\mu mole/m^2$, from about 0.5 $\mu mole/m^2$ to about 20 $\mu mole/m^2$, from about 0.8 $\mu mole/m^2$ to about 10 $\mu mole/m^2$, from about 1 $\mu mole/m^2$ to about 5 $\mu mole/m^2$, or in any range bounded by any two of the above endpoints, based on the BET surface area of the metal oxide particles.

As described above, metal oxide particles according to certain embodiments of the invention may also optionally be treated with a hydrophobicity-imparting agent. When such a hydrophobicity-imparting agent is used, it may be added to the metal oxide particles in any suitable amount. In such optional embodiments, the amount of the hydrophobicity-imparting agent may be, for example, in a range from about 0.1 $\mu mole/m^2$ to about 20 $\mu mole/m^2$, from about 0.5 $\mu mole/m^2$ to about 15 $\mu mole/m^2$, from about 1 $\mu mole/m^2$ to about 10 $\mu mole/m^2$, or in any range bounded by any two of the above endpoints (based on the BET surface area of the metal oxide particles).

The particle composition can be formulated as a dry particle composition (e.g., a dry powder) or as an aqueous or non-aqueous dispersion including the treated metal oxide particles. The dispersion can include any suitable dispersant, including water alone or with a co-solvent, treating agents, or additives of any type commonly used in dispersions of treated metal oxide particles.

The treated metal oxide particles can be used for many different applications including but not limited to toner compositions, antiblocking agents, adhesion modifiers, polymer additives (e.g., for elastomers and rubbers, such as silicone rubbers), abrasion-resistant coatings and films, delustering coatings and films, rheological control agents (e.g., for epoxies or liquid polymers), and mechanical/optical control agents (e.g., for composites and plastics). Treated metal oxide particles in accordance with the present invention are especially useful in toner compositions. In that regard, the invention provides a toner composition including toner particles and metal oxide particles treated with a charge modifying agent represented by the above described formula. In preferred embodiments, the metal oxide particles for use in toners are treated with both a charge modifying agent and a hydrophobicity-imparting agent. All other aspects of the treated metal oxide particles may be as described herein with respect to the particle composition of the invention.

Toner compositions containing the treated metal oxide particles can be formulated and developed by any suitable method. For example, toner compositions can be formulated by mixing a suitable amount of the treated particles (e.g., about 1-8 wt. % of the treated particles based on the total weight of the toner) in a blender with pulverized toner particles (e.g., styrene acrylate or polyester toner particles) having a suitable average diameter (e.g., about 9 $\mu m$). Developers may then be prepared, for example, by formulating 2 wt % of the toner with 98 wt % of a carrier. The carrier may be, for example, 70 $\mu m$ Cu—Zn ferrite coated with silicone resin. The developers may be charged, for example, by rolling in glass jars (e.g., rolling for 30 minutes at 185 rpm on a roll mill).

The tribocharge of toner compositions containing the treated metal oxide particles is often negative, as shown below in Examples 1-8, however, the invention is not limited in this regard. Tribocharge measurements can be made using suitable techniques and equipment known in the art (e.g., Vertex T-150 tribocharger). Measurements may be made after conditioning the developer overnight in a standard humidity chamber at 30° C. and 80% relative humidity (HH) and at 18° C. and 15% relative humidity (LL). Toners formulated with exemplary treated metal oxide particles in accordance with the invention may have substantially any suitable tribocharge as well as any suitable tribocharge ratio at HH and LL conditions. As described above in the Background section, the tribocharge of toners formulated with conventional silica is often low at high humidity conditions. In contrast, toners formulated with the inventive treated silica often advantageously exhibit improved tribocharging at high humidity (HH) conditions. For example, toners formulated with treated silica according to exemplary embodiments of the inventin may advantageously have a tribocharge at both HH and LL conditions with an absolute value of greater than 40 $\mu$C/g, e.g., greater than 50 $\mu$C/g. Furthermore, the ratio of the tribocharge values at HH and LL conditions may be greater than 0.5, e.g., greater than 0.6 or 0.7.

As also described above in the Background section, the tribocharging of toner formulated with alumina is often low at both high and low humidity conditions. Exemplary toner formulated with treated alumina or titania in accordance with certain embodiments of the invention often advantageously exhibits improved tribocharging. For example, toners formulated with such treated alumina or titania may advantageously have a tribocharge at both HH and LL conditions with an absolute value of greater than 10 $\mu$C/g, e.g., greater than 15 $\mu$C/g or greater than 20 $\mu$C/g.

As is known to those of ordinary skill in the art, toners may optionally include other additives, for example, for providing free flow control, lubrication, and improved developing and running performance. Such additives may include, for example, inorganic powders including metal oxides of magnesium, zinc, aluminum, cerium, cobalt, iron, zirconium, chromium, manganese, strontium, tin, or antimony; composite metal oxides including calcium titanate, magnesium titanate, or strontium titanate; metal salts including calcium carbonate, magnesium carbonate, or aluminum carbonate; clay minerals such as kaolin; phosphoric acid compounds such as apatite; silicon compounds such as silicon carbide or silicon nitride; or carbon powders such as carbon black and graphite powder. Organic particles or composite particles may also be added, including, e.g., resin particles such as polyamide resin particles, silicone resin particles, silicone rubber particles, urethane resin particles, melamine-formaldehyde resin particles, or acrylic resin particles; or composite particles of any of rubber, wax, fatty acid compound or resin with particles of an inorganic material such as metal, metal oxide or salt, or carbon black. A lubricant powder may also be added and may include, for example, fluorine resins such as Teflon and polyvinylidene fluoride; fluorine compounds such as carbon fluoride; fatty acid metal salts such as zinc stearate; fatty acids, or fatty acid derivatives such as fatty acid esters; molybdenum sulfide; amino acid, or amino acid derivatives.

Also provided is a method for preparing a treated metal oxide particle composition in accordance with the invention. The method includes providing metal oxide particles simultaneously or sequentially contacting the metal oxide particles with a hydrophobicity-imparting agent and a charge modifying agent, and recovering the hydrophobic, charge modified metal oxide particles, wherein the charge modifying agent is represented by the formula given above.

The metal oxide particles may be provided in powder form or in a suitable liquid dispersion. The invention is not limited in this regard. For example, metal oxide particles in powder form may be combined with the hydrophobicity-imparting agent and the charge modifying agent in a fluidized bed reactor. In addition, the hydrophobic charge modified metal oxide may be prepared utilizing a batch or continuous process in which the dry metal oxide is contacted with the hydrophobicity-imparting agent and charge modifying agent (in liquid or vapor form) with sufficient mixing. The mixture may then be held for a period of time at a temperature sufficient to modify the surface properties of the metal oxide. For example, a temperature range from about 25° C. to 200° C. for a time period between about 30 minutes and about 16 hours may be suitable. A temperature range from about 80° C. to 100° C. for a time period between about 30 minutes and about 2 hours may also be suitable.

The metal oxide particles may alternatively be provided in a liquid dispersion (e.g., metal oxide particles dispersed in an aqueous, non-aqueous, or mixed liquid). Aqueous dispersions of metal oxide particles can be acidic, basic, or neutral prior to combining the dispersion of metal oxide particles with charge modifying agent and/or the hydrophobicity-imparting agent. The dispersion may contain substantially any suitable amount of metal oxide particles, e.g., from about 5 to about 50 wt. % metal oxide particles. Suitable dispersions of metal oxide particles are preferably colloidally stable. Such colloidal stability inhibits any substantial portion of the particles from irreversibly agglomerating or gelling, or from settling out of the dispersion during use.

The dispersion of metal oxide particles can be provided by a commercially available dispersion of metal oxide particles (e.g., a commercially available colloidal metal oxide or a commercially available dispersion of a fumed metal oxide), several examples of which are disclosed above in connection with the particle composition of the invention. Alternatively, the aqueous dispersion of metal oxide particles can be prepared by any suitable method. For example, an aqueous dispersion of metal oxide particles can be prepared by dispersing metal oxide particles in an aqueous, non-aqueous, or mixed liquid medium using a high-shear mixer. Alternatively, a dispersion of metal oxide particles can be prepared in solution from a metal oxide precursor. For example, an aqueous dispersion of silica particles can be prepared by adjusting the pH of an alkali silicate solution to about 9 to about 11, wherein the silicate anions provided by the alkali silicate undergo polymerization to produce discrete silica particles having the desired average particle size in the form of an aqueous dispersion. Specific protocols and techniques for preparing aqueous dispersions of metal oxides in this manner and controlling the particle size of such dispersions (e.g., by adjusting temperature, concentration, and pH) are generally available in the art. Furthermore, other suitable methods of providing a dispersion of metal oxide particles are known in the art, any of which can be used in conjunction with the invention. The invention is not limited in these regards.

The charge modifying agent and/or the hydrophobicity-imparting agent may be added directly to the dispersion of metal oxide particles. For example, when the metal oxide particles are dispersed in a non-aqueous medium such as an alcohol, a ketone, an ether, or an aromatic hydrocarbon (e.g., toluene), the charge modifying agent and hydrophobicity-imparting agent will often have sufficient solubility in the liquid medium to be directly added thereto. Alternatively, the charge modifying agent and/or the hydrophobicity-imparting agent may first be dissolved in a solvent such as an alcohol, a ketone, an ether, or an aromatic hydrocarbon prior to being added to the dispersion. For example, when the metal oxide particles are dispersed in an aqueous medium, it may be advantageous to first dissolve the treating agents in an organic co-solvent. Such organic solvents are preferably, although not necessarily, water-soluble or water-miscible.

The reaction mixture including the dispersion of metal oxide particles and at least one of the charge modifying agent and the hydrophobicity imparting agent can be maintained at any temperature for any period of time that allows the treating agents to react completely, or to any extent desired, with the dispersion of the metal oxide particles (e.g., react with the silanol groups on silica particles). The reaction mixture may, for example, be maintained at a temperature of about 50° C. to about 130° C. for about 30 minutes or longer (e.g., about 1 hour or longer). Longer reaction times (e.g., about 3 hours or longer, about 7 hours or longer, or even about 20 hours or longer) may be required depending upon particular reaction conditions (e.g., temperature and concentration of reagents). Aqueous dispersions of silica may advantageously be maintained at a reaction temperature of about 50° C. to about 90° C. for at least one hour while non-aqueous dispersions of alumina and/or titania may advantageous be maintained at a reaction temperature of about 90° C. to about 130° C. for at least one hour.

The reaction mixture can be contained in an open or closed reactor. While the reaction mixture can be maintained in an atmosphere of air, oxygen can be excluded from the reaction atmosphere, in which event the reaction mixture can be maintained under an atmosphere consisting essentially of nitrogen, argon, or a mixture thereof.

When both a charge modifying agent and a hydrophobicity-imparting agent are employed, they may be combined with the dispersion in any suitable manner. For example, the dispersion of metal oxide particles can be combined with the charge modifying agent to provide a first reaction mixture, and the first reaction mixture can be maintained at substantially any temperature and for a sufficient time to allow the charge modifying agent to react with the dispersion of metal oxide particles as described herein. The hydrophobicity-imparting agent can then be added to the first reaction mixture to provide a second reaction mixture, and the second reaction mixture can then be maintained at substantially any temperature, and for a sufficient time, to allow the hydrophobicity-imparting agent to react with the metal oxide particles.

Alternatively, the dispersion may be combined with the hydrophobicity-imparting agent to provide a first reaction mixture prior to adding the charge modifying agent. This first reaction mixture can be maintained at substantially any temperature and for a sufficient time to allow the hydrophobicity-imparting agent to react with the dispersion of metal oxide particles. According to this embodiment, the charge modifying agent is subsequently added to the first reaction mixture to provide a second reaction mixture which can then be maintained at substantially any temperature, and for a sufficient time, to allow the charge modifying agent to react with the metal oxide particles.

In yet another alternative, the charge modifying agent and the hydrophobicity-imparting agent may be combined with the dispersion simultaneously, or substantially simultaneously, to provide a reaction mixture. For example, the individual treating agents may be combined simultaneously (e.g., in a solvent) and then added to the dispersion which may then be maintained at substantially any temperature, and for a sufficient time, to allow the treating agents to react with the metal oxide particles. Alternatively, individual treating agents are separately but substantially simultaneously charged into the dispersion. The treating agents may also be added stepwise to a reaction vessel containing the aqueous dispersion of metal oxide particles.

After treatment with the charge modifying agent and optionally the hydrophobicity imparting agent, the treated metal oxide particles may be recovered (isolated) from the reaction mixture and dried. The treated metal oxide particles may be recovered from the reaction mixture, for example, via centrifugation. The treated metal oxide particles may be dried after isolation from the reaction mixture, or directly from the reaction mixture, by evaporating the volatile components of the reaction mixture from the treated metal oxide particles. Evaporation of the volatile components of the reaction mixture may be accomplished using any suitable techniques, e.g., including exposure to heat and/or reduced atmospheric pressure. When heat is used, the treated metal oxide particles may be heated to any suitable drying temperature, for example, by using an oven or other similar device, or by spray drying.

Spray drying involves spraying the reaction mixture, or some portion thereof, including the charge modified metal oxide particles as a fine mist into a drying chamber, wherein the fine mist is contacted with hot air causing the evaporation of volatile components of the reaction mixture.

The drying temperature chosen will depend, at least in part, on the specific components of the reaction mixture that require evaporation. The drying temperature may be in a range from about 40° C. to about 250° C., from about 70° C. to about 200° C., from about 90° C. to about 150° C., or in any range bounded by any two of the above endpoints.

The treated metal oxide particles can be washed prior to or after isolation and/or drying from the reaction mixture. The treated metal oxide particles may be washed using a suitable washing solvent, such as water, a water-miscible organic solvent, a water-immiscible solvent, or a mixture thereof. The washing solvent can be added to the reaction mixture and the resulting mixture suitably mixed, followed by filtration, centrifugation, or drying to isolate the washed hydrophobic metal oxide particles. Alternatively, the treated metal oxide particles can be isolated from the reaction mixture prior to washing (e.g., via filtration or centrifugation). The washed treated metal oxide particles can be further washed with additional washing steps followed by additional filtration, centrifugation, and/or drying steps.

The degree of aggregation and/or agglomeration of the charge-modified metal oxide particles may optionally be reduced (if so desired) after drying using suitable techniques known to those of ordinary skill in the art, e.g., including wet or dry grinding, hammer milling, and jet milling.

The present invention will be further clarified by the following examples, which are intended to be purely exemplary of the present invention and should not be construed as in any way limiting its scope.

EXAMPLES

In the following examples, treated metal oxide particle compositions were prepared by treating aqueous or non-aqueous dispersions of commercially available metal oxide particles. Silica, alumina, and titania particles were treated in the following examples. Unless otherwise noted, treatment of the metal oxide particles was carried out in an appropriately sized 3-neck round-bottom flask equipped with an overhead stirring motor, thermocouple, and condenser. A Leco C-200 analyzer was used to determine carbon content in prepared dry samples. Uncertainty in these measurements was about 3%. All measurements were run as duplicates or triplicates with the average value being reported in the following Tables.

Toner compositions including treated silica (Examples 1 and 2 and Comparative Example 1) were prepared by mixing 4% treated silica particles in a laboratory blender for three minutes with 96% of a pulverized polyester toner (0728 Base Toner available from Raven Industries, Inc., Latrobe, Pa.). Mixing was conducted for approximately 20% of the time in order to keep the toner from heating above its glass transition temperature.

Toner compositions including treated alumina or titania (Examples 3-7 and Comparative Example 2) were prepared by mixing 1.5% treated metal oxide (alumina or titania) particles in a laboratory blender for three minutes with 98.5% of a pulverized polyester toner (approximately 10-12 micron average diameter). Mixing was conducted for approximately 20% of the time in order to keep the toner from heating above its glass transition temperature.

Developers were prepared from the above described toner compositions by mixing 2 wt % of the toner with 98 wt % of a 70 μm Cu—Zn ferrite based carrier coated with silicone resin (the carrier was obtained from Powdertech Co., Ltd.) Samples were conditioned in a standard humidity chamber at either relative high temperature and humidity (30 degrees C. and 80% relative humidity) (referred to herein as 'HH') or relatively low temperature and humidity (18 degrees C. and 15% relative humidity) (referred to herein as 'LL'). Developers were placed into glass jars and charged by rolling the jars for 30 min at 185 rpm on a roll mill. Tribocharge measurements were made using a Vertex T-150 tribocharge tester. Each measurement was repeated three times with the average value being reported in the following Tables.

Example 1

Five metal oxide particle compositions (Compositions 1A through 1E) were prepared by first treating colloidal silica with hexamethyldisilazane (HMDZ) (Gelest, Inc., used as received) and then with 3-(2,4-dinitrophenylamino)propyltriethoxysilane (DNPS, CAS#71783-41-0). A control composition was also prepared by treating colloidal silica with HMDZ alone. Each composition was prepared by adding 6.8 g (0.042 mol) of HMDZ to 200 g of Snowtex-OYL™ colloidal silica dispersion. Snowtex-OYL (Nissan Chemical) is an aqueous dispersion of colloidal silica having 20 weight percent silica, a pH in the range from 2.0-2.6, a mean particle size of about 80 nm+/−10 nm (with $d_{10}$=60 nm and $d_{90}$=120 nm), and a BET surface area in the range from 34-42 $m^2/g$. The silica dispersion-HMDZ mixture was heated to 70° C. for two hours and then allowed to cool to room temperature. After the mixture reached room temperature (for Compositions 1A through 1E), predetermine amounts of DNPS were dissolved in 50 ml of THF (Fisher Scientific, used without purification) and then added to the silica HMDZ mixture. A volume of ethanol (70 ml) (Fisher Scientific, used without purification) was also added to the mixture. The final mixture was heated to reflux temperature (approximately 64° C.) and continuously agitated for 5 hours. After cooling to room temperature, a yellow solid was separated by centrifugation and dried at 135° C. for several hours. The carbon contents of the control sample and of compositions 1A through 1E are reported in Table 1.

Toner compositions were prepared using the Control sample and Compositions 1A through 1E in the manner previously described (for silica compositions). The tribocharge values of the toner compositions are also reported in Table 1. Estimated standard deviations for the tribocharge values are shown parenthetically.

TABLE 1

| Composition | Loading of DNPS (mmol/g) | Carbon Content (wt. %) | Tribocharge HH (μC/g) | Tribocharge LL (μC/g) | HH/LL |
|---|---|---|---|---|---|
| CONTROL | 0 | 0.7 | −27.7(0.3) | −68.2(0.7) | 0.41 |
| 1A | 0.0125 | 1.2 | −37.7(0.6) | −77.8(3.0) | 0.48 |
| 1B | 0.025 | 1.5 | −41.2(1.9) | −81.5(2.0) | 0.51 |
| 1C | 0.05 | 1.8 | −51.5(2.5) | −80.0(2.3) | 0.64 |
| 1D | 0.1 | 2.2 | −52.5(1.0) | −81.0(2.4) | 0.65 |
| 1E | 0.15 | 3.7 | −60.3(1.3) | −89.0(3.0) | 0.68 |
| 1F | 0.2 | 3.3 | −46(1) | −78(2) | 0.60 |
| 1G | 0.3 | 5.9 | −45(1) | −73(4) | 0.62 |

A comparison of Compositions 1A through 1E with the Control demonstrates that the tribocharge increases with increased DNPS loading. This can be further appreciated by comparing the carbon content and tribocharge data. The HH:LL ratio was also demonstrated to increase with increased DNPS loading.

Example 2

Five metal oxide particle compositions (Compositions 2A through 2E) were prepared by first treating colloidal silica with DNPS and then with HMDZ. Each composition was prepared by dissolving a predetermined amount of DNPS was in 50 ml of THF, which was then added to 200 g of Snowtex-OYL™ colloidal silica dispersion. After 5 minutes of mixing, 70 ml of ethanol was added to the reaction flask and the mixture was heated to 70° C. After 5 hours of heating, 6.8 g (0.042 mol) of HMDZ was introduced into the mixture. The temperature of the mixture was maintained at 70° C. for an additional 3 hours. After cooling to room temperature, a yellow solid was separated by centrifugation and dried at 135° C. for several hours. The carbon contents of compositions 2A through 2E are reported in Table 2.

Toner compositions were prepared using Compositions 2A through 2E in the manner previously described (for silica compositions). The tribocharge values of the toner compositions are also reported in Table 2. Estimated standard deviations for the tribocharge values are shown parenthetically.

TABLE 2

| Composition | Loading of DNPS (mmol/g) | Carbon Content (wt. %) | Tribocharge HH (μC/g) | Tribocharge LL (μC/g) | HH/LL |
|---|---|---|---|---|---|
| CONTROL | 0 | 0.70 | −27.7(0.3) | −68.2(0.7) | 0.41 |
| 2A | 0.0125 | 0.82 | −40.2(1.0) | −86.1(2.7) | 0.47 |
| 2B | 0.025 | 0.89 | −47.5(1.4) | −90.3(3.0) | 0.53 |
| 2C | 0.05 | 1.19 | −49.0(1.2) | −94.5(3.0) | 0.52 |
| 2D | 0.10 | 1.85 | −49.4(0.6) | −92.3(1.1) | 0.54 |
| 2E | 0.15 | 2.63 | −64.2(2.6) | −93.1(2.7) | 0.69 |
| 2F | 0.2 | 2.4 | −51(2) | −90(4) | 0.57 |

A comparison of Compositions 2A through 2E with the Control demonstrates that the tribocharge increases with increased DNPS loading. This can be further appreciated by comparing the carbon content and tribocharge data. The HH:LL ratio was also demonstrated to increase with increased DNPS loading.

Example 3

Three metal oxide particle compositions (Compositions 3A through 3C) were prepared by treating alumina with various mixtures of isobutyltrimethoxysilane (IBTMS) and DNPS. A Control composition was also prepared by treating alumina with IBTMS alone. Each composition was prepared by dispersing 15 g of fumed alumina (Cabot Corporation SpectrAl® 81 fumed alumina having a BET surface area of 81 m²/g) in 125 ml toluene. After dispersion of the alumina, 0.02 mol of mixed silane was added (the IBTMS:DNPS ratios are shown in Table 3). The dispersion mixture was heated to 110° C. and held at that temperature for 3 hours. The dispersion was then cooled to room temperature and centrifuged to recover the treated alumina particles.

The treated alumina particles were washed in methanol via re-dispersing in 200 ml of methanol. The methanol dispersion was then centrifuged to recover the washed treated alumina particles. The methanol wash procedure was then repeated. Solids were then further dried in a vacuum oven at 110° C. for greater than 12 hours. Toner compositions were prepared using the Control composition and Compositions 3A through 3C in the manner previously described (for treated alumina and titania particle compositions). The carbon contents of the particle compositions are reported in Table 3. The tribocharge values of the toner compositions are also reported in Table 3.

TABLE 3

| Compo-sitions | Treating Agents (molar ratio) | Carbon Content (wt. %) | Tribocharge HH ($\mu C/g$) | Tribocharge LL ($\mu C/g$) | HH/LL |
|---|---|---|---|---|---|
| CONTROL | IBTMS/DNPS (100:0) | 2.22 | −10.1 | −2.90 | 3.48 |
| 3A | IBTMS/DNPS (95:5) | 2.60 | −15.7 | −14.0 | 1.12 |
| 3B | IBTMS/DNPS (80:20) | 2.45 | −19.8 | −24.2 | 0.82 |
| 3C | IBTMS/DNPS (0:100) | 3.50 | −24.4 | −46.8 | 0.52 |

In Table 3, the Control sample was produced by treating fumed alumina with a conventional hydrophobicity-imparting silane, isobutyltrimethoxysilane (IBMS), and the tribocharge level (both HH and LL) of the treated particles is low. Samples 3A and 3B were prepared through co-treatment of IBMS and DNPS. Apparently, the use of DNPS significantly enhanced the tribocharge of the system. As more DNPS was incorporated, a higher tribocharge was exhibited. The alumina that was treated with only DNPS (Example 3C) exhibited the highest LL tribocharging (−46.8 $\mu C/g$), although the HH/LL ratio is low. Without being bound by any particular theory, it is thought that this is due to the reduction of its hydrophobicity, as no hydrophobicity-imparting agent was used in this case.

Example 4

A metal oxide particle composition (Composition 4A) was prepared by treating titania with a mixture of octyltriethoxysilane (OTES) and DNPS. A Control composition was also prepared by treating titania with OTES alone. Each composition was prepared by dispersing 15 g fumed $TiO_2$ (Degussa P25™) in 100 ml toluene. After dispersion of the $TiO_2$, 0.1 mol of silane was added (the OTES:DNPS ratios are shown in Table 4). The dispersion mixture was heated to 110° C. and held at that temperature for 3 hours. The dispersion was then cooled to room temperature and centrifuged to recover the treated titania particles.

The treated titania particles were washed in methanol via re-dispersing in 200 ml of methanol. The methanol dispersion was then centrifuged to recover the washed treated titania particles. The methanol wash procedure was then repeated. Recovered solids were dried in a vacuum oven at 110° C. for greater than 12 hours. Toner compositions were prepared using the Control composition and Compositions 4A in the manner previously described (for treated alumina and titania particle compositions). The carbon contents of the particle compositions are reported in Table 4. The tribocharge values of the toner compositions are also reported in Table 4.

TABLE 4

| Compo-sitions | Treating Agents (molar ratio) | Carbon Content (wt. %) | Tribocharge HH ($\mu C/g$) | Tribocharge LL ($\mu C/g$) | HH/LL |
|---|---|---|---|---|---|
| CONTROL | OTES/DNPS (100:0) | 1.60 | −16.4 | −22.3 | 0.74 |
| 4A | OTES/DNPS (80:20) | 1.87 | −28.5 | −38.1 | 0.75 |

While the HH/LL ratio is not improved in this case, the tribocharging level of $TiO_2$ is significantly improved with the utilization of DNPS.

Example 5

A metal oxide particle composition (Composition 5A) was prepared by treating alumina with a mixture of (OTES) and 3-(triethoxysilylpropyl)-p-nitrobenzamide (TESPNBA, CAS#60871-86-5). A Control composition was also prepared by treating alumina with OTES alone. Each particle composition was prepared as described above in Example 3 with the exception that OTES and TESPNBA silanes were utilized. Toner compositions were prepared using the Control composition and Composition 5A in the manner previously described (for treated alumina and titania particle compositions). The carbon contents of the particle compositions are reported in Table 5. The tribocharge values of the toner compositions are also reported in Table 5.

TABLE 5

| Compo-sitions | Treating Agents (molar ratio) | Carbon Content (wt. %) | Tribocharge HH ($\mu C/g$) | Tribocharge LL ($\mu C/g$) | HH/LL |
|---|---|---|---|---|---|
| CONTROL | OTES/TESPNBA (100:0) | 3.67 | −9.6 | −2.4 | 4.0 |
| 5A | OTES/TESPNBA (90:10) | 3.11 | −15.0 | −22.8 | 0.66 |

A comparison of the Control composition and Composition 5A demonstrates that the absolute value of the tribocharge increases with the utilization of TESPNBA, although the HH/LL ratio is not improved with the utilization of TESPNBA Example 6

Two metal oxide particle compositions (Composition 6A and 6B) were prepared by treating alumina with mixtures of (OTES) and pentafluorophenyltriethoxylane (PFPTES, CAS#20083-34-5). Each particle composition was prepared as described above in Example 3 with the exception that OTES and PFPTES silanes were utilized. Toner compositions were prepared using Composition 6A and 6B in the manner previously described (for treated alumina and titania particle compositions). The carbon contents of the particle compositions are reported in Table 6. The tribocharge values of the toner compositions are also reported in Table 6.

TABLE 6

| Compositions | Treating Agents (molar ratio) | Carbon Content (wt. %) | Tribocharge HH (μC/g) | Tribocharge LL (μC/g) | HH/LL |
|---|---|---|---|---|---|
| CONTROL | OTES/PFPTES (100:0) | 3.67 | −9.6 | −2.4 | 4.0 |
| 6A | OTES/PFPTES (90:10) | 2.04 | −12.5 | −18.0 | 0.69 |
| 6B | OTES/PFPTES (0:100) | 0.77 | −12.1 | −27.0 | 0.45 |

A comparison of the Control composition and Compositions 6A and 6B demonstrates that the absolute value of the tribocharge increases with the utilization of PFPTES, although the HH/LL ratio is not improved with the utilization of PFPTES in this case.

Example 7

Three metal oxide particle compositions (Composition 7A, 7B, and 7C) were prepared by treating alumina with mixtures of OTES and 2-(4-chlorosulfonylphenyl)ethyltrimethoxysilane (CSPES). Each particle composition was prepared as described above in Example 3 with the exception that OTES and CSPES silanes were utilized. Toner compositions were prepared using Composition 7A, 7B, and 7C in the manner previously described (for treated alumina and titania particle compositions). The carbon contents of the particle compositions are reported in Table 7. The tribocharge values of the toner compositions are also reported in Table 7.

TABLE 7

| Compositions | Treating Agents (molar ratio) | Carbon Content (wt. %) | Tribocharge HH (μC/g) | Tribocharge LL (μC/g) | HH/LL |
|---|---|---|---|---|---|
| CONTROL | OTES/CSPES (100:0) | 3.67 | −9.6 | −2.4 | 4.0 |
| 7A | OTES/CSPES (95:5) | 2.9 | −11.0 | −22.6 | 0.49 |
| 7B | OTES/CSPES (90:10) | 3.0 | −14.4 | −24.0 | 0.60 |
| 7C | OTES/CSPES (0:100) | 3.1 | −20.1 | −28.0 | 0.72 |

A comparison of the Control composition and Compositions 7A, 7B, and 7C demonstrates that the absolute value of the tribocharge increases with the utilization of CSPES.

Example 8

A single metal oxide particle composition (Composition 8A) was prepared by treating alumina with a mixture of DNPS and PFPTES. Each particle composition was prepared as described above in Example 3 with the exception that DNPS and PFPTES silanes were utilized. A toner composition was prepared using Composition 8A in the manner previously described (for treated alumina and titania particle compositions). The carbon content of the particle composition is reported in Table 8. The tribocharge values of the toner composition are also reported in Table 8. Table 8 also compares the carbon content and tribocharge values to those of Compositions 3C and 6B reported above.

TABLE 8

| Compositions | Treating Agents (molar ratio) | Carbon Content (wt. %) | Tribocharge HH (μC/g) | Tribocharge LL (μC/g) | HH/LL |
|---|---|---|---|---|---|
| 8A | DNPS/PFPTES (50:50) | 1.90 | −25.1 | −43.4 | 0.58 |
| 3C | DNPS/PFPTES (100:0) | 3.50 | −24.4 | −46.8 | 0.52 |
| 6B | DNPS/PFPTES (0:100) | 0.77 | −12.1 | −27.0 | 0.45 |

A comparison of these three compositions shows that use of two charge modifying agents still provides a treated alumina product with high tribocharge under HH conditions, with a noticable improvement in the HH/LL ratio with respect to the use of DNPS alone.

Comparative Example 1

The first comparative composition was prepared by slowly adding 196 g (248 ml) of 2-propanol to 600 g of Snowtex OL-40 dispersion. Snowtex OL-40 is an aqueous dispersion of colloidal silica having 40 weight percent silica, a pH in the range from 2.0-2.6, a mean particle size of 45 nm (with $d_{10}$=20 nm and $d_{90}$=90 nm), and a BET surface area in the range from 60-75 m$^2$/g. After 5 minutes of stirring, 35.5 g (0.130 mol) of diphenyldiethoxysilane (molecular weight 272.4) was added to the reaction flask and the temperature was raised to 75° C. The reaction was allowed to proceed for 5.5 hours, after which the mixture was cooled to room temperature, transferred to a Pyrex® tray and dried in an oven at 110° C.

A toner composition was prepared in the manner previously described (for a treated silica composition). The carbon content of the particle composition is reported in Table 9. The tribocharge values of the toner composition is also reported in Table 9.

TABLE 9

| Composition | Treating Agents (molar ratio) | Carbon Content (wt. %) | Tribocharge HH (μC/g) | Tribocharge LL (μC/g) | HH/LL |
|---|---|---|---|---|---|
| Compare A | (Ph)$_2$Si(OEt)$_2$ | 5.23 | −21.3 | −42.0 | 0.5 |

Comparative Example 2

The second comparative composition was prepared by dispersing 15 g of fumed alumina (Cabot Corporation® SpectrAl® 81) in 125 ml toluene. After dispersion of the alumina, 0.02 mol of 4-methylphenyltrimethoxysilane was added. The dispersion mixture was heated to 110° C. and held at that temperature for 3 hours. The dispersion was then cooled to room temperature and centrifuged to recover the treated alumina particles.

The treated alumina particles were washed and separated using the same methanol wash, centrifugation, and drying procedures disclosed above in Example 2. A toner composition was prepared in the manner previously described (for treated alumina and titania particle compositions). The carbon content of the particle composition is reported in Table 10. The tribocharge values of the toner compositions are also reported in Table 10.

TABLE 10

| Composition | Treating Agents (molar ratio) | Carbon Content (wt. %) | Tribo-charge HH (μC/g) | Tribo-charge LL (μC/g) | HH/LL |
|---|---|---|---|---|---|
| Compare B | CH₃C₆H₄Si(OEt)₃ | 2.71 | −5.0 | −0.8 | 6.4 |

Examples 1 through 8 demonstrate that treatment of metal oxides with compounds having aryl groups substituted with a strong electron withdrawing group results in treated particles having a high tribocharge and a high HH/LL ratio. The Comparative Examples A show that treatment with compounds having aryl groups not substituted with a strong electron withdrawing group results in treated particles having a comparatively low tribocharge and low HH/LL ratio (similar to alkyloxy treatments known in the prior art).

The foregoing description of preferred embodiments of the present invention has been presented for the purposes of illustration and description. It is not intended to be exhaustive or to limit the invention to the precise form disclosed. Modifications and variations are possible in light of the above teachings, or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

We claim:

1. A toner composition comprising toner particles and metal oxide particles treated with at least a charge modifying agent, wherein the charge modifying agent is represented by the following formula:

An-$Z_c$—$Y_b$—Ar(EW)$_a$ wherein Ar represents an aromatic group, EW represents an electron withdrawing group, Y represents a spacer group, Z represents an alkylene group, An represents an anchor group, a is an integer from 1 to 5, b is 0 or 1, and c is 0 or 1, wherein Y is —N(R)—, —N(R)C(O)—, —C(O)N(R)—, —OC(O)—, —C(O)O—, —O—, —S—, —CH═N—, —N═CH—, —N═N—, or —S(O)₂—, wherein R represents hydrogen or a substituted or unsubstituted aryl or alkyl group, An is represented by $X_dSiR'_{(3-d)}$, wherein X represents equal or different hydroloyzable groups or a siloxane group, R' represents hydrogen or a substituted or unsubstituted aryl or alkyl group, and d is an integer from 1 to 3, and the metal oxide particles are silica, alumina, ceria, titania, or a mixture thereof.

2. The toner composition of claim 1, wherein the metal oxide particles are fumed metal oxide particles, co-fumed metal oxide particles, precipitated metal oxide particles, or colloidal metal oxide particles.

3. The toner composition of claim 1, wherein EW is —NO₂, —CN, —COCH₃, —SO₃H, —SO₂CH₃, —F, or —(CF₂)$_n$CF₃, wherein n is 0 or an integer from 1 to 10.

4. The toner composition of claim 1, wherein the electron withdrawing group is a group having a Hammett Constant of at least 0.2 in either the meta or para position.

5. The toner composition of claim 1, wherein Z is (CH₂)$_e$, wherein e is an integer from 1 to 18.

6. The toner composition of claim 1, wherein the charge modifying agent is selected from the group consisting of 3-(2,4-dinitrophenylamino) propyltriethoxysilane (DNPS), 3,5-dinitrobenzamido-n-propyltriethoxysilane, 3-(triethoxysilylpropyl)-p-nitrobenzamide (TESPNBA), pentafluorophenyltriethoxysilane (PFPTES), and [2-(4-chlorosulfonylphenyl)ethyltrimethoxysilane (CSPES).

7. The toner composition of claim 1, wherein the metal oxide particles are also treated with a hydrophobicity-imparting agent.

8. The toner composition of claim 7, wherein the hydrophobicity-imparting agent is a silazane compound, a siloxane compound, or a silane compound.

9. The toner composition of claim 7, wherein the hydrophobicity-imparting agent is hexamethyldisilazane (HMDZ), isobutyltrimethoxysilane, or octyltrimethoxysilane.

10. The toner composition of claim 7, wherein the metal oxide particles are colloidal silica, the hydrophobicity-imparting agent is HMDZ, and the charge modifying agent is DNPS.

11. The toner composition of claim 1, wherein the metal oxide particles are treated with a second charge modifying agent represented by the following formula:

An-$Z_c$—$Y_b$—Ar(EW)$_a$ wherein Ar represents an aromatic group, EW represents an electron withdrawing group, Y represents a spacer group, Z represents an alkylene group, An represents an anchor group, a is an integer from 1 to 5, b is 0 or 1, and c is 0 or 1.

12. The toner composition of claim 11, wherein the second charge modifying agent is selected such that EW is —F or —(CF₂)$_n$CF₃, wherein n is 0 or an integer from 1 to 10.

13. The toner composition of claim 1, wherein a loading level of the charge modifying agent on the treated metal oxide particles is in the range from 0.1 to 100 μmol/m².

14. The toner composition of claim 1, wherein a loading level of the charge modifying agent on the treated metal oxide particles is in the range from 1 to 5 μmol/m².

* * * * *